C. P. STEINMETZ.
PROTECTIVE DEVICE.
APPLICATION FILED JUNE 19, 1913.
1,230,615.
Patented June 19, 1917.
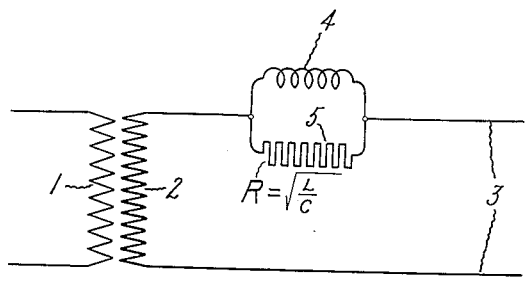
WITNESSES:
INVENTOR:
CHARLES P. STEINMETZ,
BY
HIS ATTORNEY.

UNITED STATES PATENT OFFICE.

CHARLES P. STEINMETZ, OF SCHENECTADY, NEW YORK, ASSIGNOR TO GENERAL ELECTRIC COMPANY, A CORPORATION OF NEW YORK.

PROTECTIVE DEVICE.

1,230,615.   Specification of Letters Patent.   Patented June 19, 1917.

Application filed June 19, 1913. Serial No. 774,513.

*To all whom it may concern:*

Be it known that I, CHARLES P. STEINMETZ, a citizen of the United States, residing at Schenectady, county of Schenectady, State of New York, have invented certain new and useful Improvements in Protective Devices, of which the following is a specification.

My invention relates to protective devices for electrical installations, and in particular to devices for protecting electrical apparatus, such as transformers, included in a high voltage electrical transmission system.

A matter of great importance in high voltage transmission systems is the protection of the electrical apparatus, and in particular the transformers, included in the system, from objectionable abnormal disturbances. Such disturbances are caused by atmospheric discharges, by switching, and by other abnormal phenomena. These disturbances are of an oscillatory character, usually of high frequency, and tend to build up within the system dangerous and destructive voltages. The objectionable disturbances may arise within the apparatus, or more generally the particular section of the installation to be protected, or may arise without the apparatus. A protective device to be entirely satisfactory must protect the apparatus regardless of the source of the disturbance. A protective device should, therefore, guard the apparatus against the entrance of objectionable disturbances, having their origin in the transmission system, and should at the same time permit the exit into the transmission system of all such disturbances originating within the apparatus itself.

The object of my invention is to provide a protective device which is selective in its action and permits a free flow of high frequency currents coming from one direction, but reflects such currents coming from the opposite direction. As applied to an electrical installation comprising two sections, each having distributed resistance, inductance and capacity, the object of my invention is to provide a protective device which will permit the free exit of high frequency disturbances arising within one section of the installation and will reflect back toward the source high frequency disturbances arising in the other section. In the application of my invention to a transformer, my object is to protect the windings of the transformer against the entrance of objectionable disturbances from the transmission system, since such disturbances build up destructive voltages within the transformer. At the same time, my object is to provide a device which will allow the free exit into the line or transmission system of any disturbance originating within the transformer, since otherwise such a disturbance would by reflection increase in voltage, and therefore, in destructiveness.

Every oscillatory circuit, that is, a circuit having distributed capacity and inductance, has a surge resistance of definite ohmic value which is determined by the following formula, where R represents the ohmic value of the surge resistance and L and C the inductance and capacity in henries and farads respectively of the circuit:

$$R = \sqrt{\frac{L}{C}}$$

The surge resistance may be defined as a resistance of such ohmic value that if the circuit is closed through this critical or surge resistance any disturbance in the circuit passes into the resistance without reflection, while a higher, as well as a lower, resistance causes a partial reflection of the disturbance back into the circuit, the reflection being greater, the greater the resistance differs from the critical value. The surge resistance is independent of frequency, and therefore, the circuit which is closed through a resistance whose ohmic value is approximately equal to the ohmic value of the surge resistance of the circuit, will permit a free passage of alternating current regardless of the frequency of such current.

The surge resistance of the line conductors of a transmission system is usually a few hundred ohms. The surge resistance of electrical apparatus is usually considerably higher. For example, the surge resistance of transformers is usually several thousand ohms. This difference in the surge resistance of transmission conductors and electrical apparatus, in particular transformers, permits an arrangement of inductance and resistance which freely passes disturbances coming from the apparatus into the line, but reflects practically completely any disturbance coming from the line, and so protects the apparatus from disturbances coming from either direction.

In carrying out my invention I take advantage of the above described characteristics of the surge resistance. I provide an arrangement of inductance and resistance which in substance closes a circuit for the flow of high frequency currents through a resistance approximately equal in ohmic value to the ohmic value of the surge resistance of the apparatus to be protected. To this end, I include in series with one or more transmission conductors of the installation an inductance of as high value as is economically permissible and of negligible capacity. Each inductance I shunt by a non-inductive resistance approximately equal to the surge resistance of the apparatus to be protected.

The features which I believe to be patentably novel in my invention are definitely indicated in the claims appended hereto. The arrangement of apparatus in and the mode of operation of an electrical installation embodying the features of my invention will be understood from the following description taken in connection with the foregoing explanation and the accompanying drawings in which:

The figure is a diagrammatic representation of the application of my invention to the protection of a transformer.

The transformer is diagrammatically represented with a low voltage winding 1 and a high voltage winding 2. The high voltage winding is connected to a transmission system comprising line conductors 3. It will be understood that translating devices of any desired character may be operatively connected to the conductors 3, but such devices have been omitted in the drawings in order to secure simplicity in the showing.

An inductive winding or inductance 4 is included in series with a line conductor 3 and is shunted by a resistance 5. The inductive winding 4 has as high inductance as permissible without offering any appreciable impedance to the flow of current of normal frequency. At the same time, the inductance is sufficiently great to offer substantially infinite impedance to the flow of high frequency currents. The resistance 5 has an ohmic value approximately equal to the ohmic value of the surge resistance of the transformer. If the transformer has a capacity of C farads and an inductance of L henries, then the ohmic value of the resistance 5 should be approximately $\sqrt{\frac{L}{C}}$ ohms.

In the case of a typical transformer this surge resistance will be a few thousand ohms. It will be observed that the inductive winding 4 in substance provides an open circuit to the flow of high frequency currents, but this open circuit is closed for the flow of such currents through the resistance 5. Furthermore, it must be understood that, where the inductance 4 is not so large as to be practically an open circuit for the high frequency disturbance, but for economic reasons is chosen smaller,—usually small—part of the disturbance passes through the inductance 4, and the resistance 5 then has to be chosen somewhat higher than the surge resistance R, so that the resultant of the resistance 5 and the effective high frequency resistance of 4 equals the surge resistance R.

The operation of my protective device will be understood, it is believed, from the foregoing explanation. The low frequency main working current passes through the inductance 4 practically unimpeded. Due to the very high ohmic value of the resistance 5, substantially no current of normal frequency passes through this resistance. High frequency disturbances cannot pass through the inductance 4, due to the enormous impedance of the inductance for high frequency currents. The inductance thus, in substance, forms an open circuit in the transmission conductors for high frequency currents. This open circuit is, however, closed through the resistance 5.

The surge resistance of the transmission conductors is only a few hundred ohms, and, therefore, any high frequency disturbance coming from the conductors will be reflected back again to the source of such disturbance by the inductance 4, and very little of the disturbance will pass through the resistance 5 which is many times greater in ohmic value than the ohmic value of the surge resistance of the transmission conductors. On the other hand, a high frequency disturbance coming from the transformer is not reflected by the resistance 5, since this resistance is approximately equal to the surge resistance of the transformer. Instead, any such disturbance from the transformer passes through the resistance and sets up no oscillations whatever. High frequency disturbances originating in the transformer and passing out through the resistance 5 are dissipated in the resistance, or may be considered as "let out" into a line of infinite effective length.

It will thus be seen that I have provided a unidirectional surge absorber. The surges or high frequency oscillations coming in one direction are permitted to pass freely into the absorber, while surges or high frequency oscillations coming from the other direction are reflected back toward the source from whence they come. The unidirectional feature of my surge absorber depends for its operation upon a difference in the surge resistance of certain sections of the transmission system. It will be understood that the greater the difference in the value of the surge resistance of these sections, the more selective will be the action of my protective device.

I have herein explained in detail the principle and operation of my invention and the manner of carrying the same into practical use. Numerous types and arrangements of apparatus suitable for the purpose of carrying out my invention will be apparent to those skilled in the art. I accordingly aim in the appended claims to cover all modifications and arrangements of apparatus within the spirit of my invention.

What I claim as new and desire to secure by Letters Patent of the United States, is:—

1. The combination with an electrical installation comprising two adjacent sections, the surge resistance of one section being of different ohmic value than the surge resistance of the other section, of a resistance having an ohmic value approximately equal to the ohmic value of the surge resistance of one section, and means for directing the flow of high frequency disturbances arising in either section to said resistance.

2. The combination with an electrical installation comprising two adjacent sections, each section having combined resistance inductance and capacity, of means operatively related to said installation and including ohmic resistance for permitting the free exit of high frequency disturbances arising within one section of said installation and for reflecting back toward the source high frequency disturbances arising in the other section.

3. The combination with an electrical installation comprising two adjacent sections, each section having combined resistance, inductance and capacity, the inductance and capacity of one section differing from the inductance and capacity of the other section, means included in said installation for practically open circuiting the installation to the flow of high frequency current without offering substantial impedance to the flow of current of normal frequency, and a resistance in shunt relation to said means and having an ohmic value of such amount as to permit the free exit of high frequency disturbances arising within one section of said installation and to reflect back toward the source high frequency disturbances arising in the other section.

4. The combination with an electrical installation comprising transmission conductors and an apparatus to be protected, of a resistance approximately equal in ohmic value to the ohmic value of the surge resistance of said apparatus, and means for directing the flow of high frequency disturbances to said resistance.

5. The combination with an electrical installation comprising transmission conductors and an apparatus to be protected, said apparatus having a surge resistance whose ohmic value is greater than the ohmic value of the surge resistance of said transmission conductors, of an inductance connected in series with a transmission conductor, and a resistance connected in shunt relation to said inductance and having an ohmic value approximately equal to the ohmic value of the surge resistance of said apparatus.

6. The combination with an electrical installation comprising transmission conductors and an apparatus having a surge resistance of relatively large ohmic value compared with the ohmic value of the surge resistance of the transmission conductors, of a non-inductive resistance having an ohmic value approximately equal to the ohmic value of the surge resistance of said apparatus, and means for directing the flow of high frequency disturbances arising in said apparatus or in said transmission conductors to said resistance.

7. The combination with an electrical installation comprising transmission conductors and an apparatus to be protected, said apparatus having a surge resistance of relatively large ohmic value compared with the ohmic value of the surge resistance of the transmission conductors, of an inductance connected in series with a transmission conductor, and a non-inductive resistance having an ohmic value approximately equal to the ohmic value of the surge resistance of said apparatus and connected in shunt relation to said inductance.

8. The combination with an electrical installation comprising transmission conductors and a transformer, of means for permitting the free exit of high frequency disturbances arising within the transformer and for preventing the entrance into the transformer of high frequency disturbances arising without the transformer.

9. The combination with an electrical installation comprising transmission conductors and a transformer, of means included in said installation for practically open circuiting the installation to the flow of high frequency disturbances without offering substantial impedance to the flow of current of normal frequency, and a resistance in shunt relation to said means and having an ohmic value of such amount as to permit the free exit of high frequency disturbances arising within said transformer and to reflect back toward the source high frequency disturbances arising without said transformer.

10. The combination with an electrical installation comprising transmission conductors and a transformer, of a resistance approximately equal in ohmic value to the ohmic value of the surge resistance of said transformer, and means for directing the flow of high frequency disturbances to said resistance.

11. The combination with an electrical installation comprising transmission conductors and a transformer, of an inductance connected in series with a transmission conductor, and a non-inductive resistance having an ohmic value approximately equal to the ohmic value of the surge resistance of said transformer and connected in shunt relation to said inductance.

In witness whereof, I have hereunto set my hand this 17th day of June, 1913.

CHARLES P. STEINMETZ.

Witnesses:
BENJAMIN B. HULL,
HELEN ORFORD.